United States Patent
Kim et al.

(10) Patent No.: US 10,457,796 B2
(45) Date of Patent: Oct. 29, 2019

(54) POLYAMIDE RESIN COMPOSITION AND MOLDED ARTICLE PRODUCED THEREFROM

(71) Applicant: Lotte Advanced Materials Co., Ltd., Yeosu-si (KR)

(72) Inventors: Kyung Rae Kim, Uiwang-si (KR); Ik Mo Kim, Uiwang-si (KR); Chan Gyun Shin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/393,370

(22) Filed: Dec. 29, 2016

(65) Prior Publication Data

US 2017/0190883 A1     Jul. 6, 2017

(30) Foreign Application Priority Data

Dec. 31, 2015   (KR) .................. 10-2015-0191460

(51) Int. Cl.
C08L 77/06     (2006.01)
C08K 3/04      (2006.01)
C08K 7/14      (2006.01)

(52) U.S. Cl.
CPC .............. *C08K 7/14* (2013.01); *C08K 3/04* (2013.01); *C08K 3/041* (2017.05); *C08K 2201/003* (2013.01); *C08K 2201/004* (2013.01); *C08K 2201/005* (2013.01)

(58) Field of Classification Search
CPC ..................................... C08K 7/14
See application file for complete search history.

(56) References Cited

U.S. PATENT DOCUMENTS

| | | | |
|---|---|---|---|
| 8,324,297 B2 | 12/2012 | Hewel et al. | |
| 9,447,575 B2 | 9/2016 | Nakagawa et al. | |
| 2010/0192851 A1* | 8/2010 | Shah ............... | B82Y 30/00 118/620 |
| 2010/0279569 A1 | 11/2010 | Shah et al. | |
| 2012/0010316 A1* | 1/2012 | Meyer ............. | B82Y 30/00 522/33 |
| 2016/0263840 A1 | 9/2016 | Choi et al. | |

FOREIGN PATENT DOCUMENTS

| | | |
|---|---|---|
| CN | 102140247 A | 8/2011 |
| CN | 102333645 A | 1/2012 |
| CN | 103201344 A | 7/2013 |
| CN | 104194330 A | 12/2014 |
| CN | 104995245 A | 10/2015 |
| JP | 2008-274305 A | 11/2008 |
| KR | 10-2013-0118626 A | 10/2013 |

OTHER PUBLICATIONS

Office Action in counterpart Korean Application No. 10-2015-0191460 dated Sep. 14, 2017, pp. 1-8.
Office Action in counterpart Chinese Application No. 1201611247676.6 dated Sep. 29, 2018, pp. 1-4.
English-translation of Office Action in counterpart Chinese Application No. 1201611247676.6 dated Sep. 29, 2018, pp. 1-6.

* cited by examiner

*Primary Examiner* — Ling Siu Choi
*Assistant Examiner* — Thuy-Ai N Nguyen
(74) *Attorney, Agent, or Firm* — Additon, Higgins & Pendleton, P.A.

(57) ABSTRACT

Provided are a polyamide resin composition and a molded article produced therefrom. The polyamide resin composition includes: a base resin including a polyamide resin having an intrinsic viscosity (IV) of about 0.9 dL/g or less and milled glass fibers; and carbon nanotube flakes having a size of about 1.0 mm to about 5.0 mm.

8 Claims, No Drawings

POLYAMIDE RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application No. 10-2015-0191460, filed on Dec. 31, 2015 in the Korean Intellectual Property Office, the entire disclosure of which is incorporated herein by reference.

FIELD

The present invention relates to a polyamide resin composition and a molded article produced therefrom.

BACKGROUND

Typically, a liquid crystal polymer (LCP) has been used as a material for a small camera module in mobile phones and the like. However, a liquid crystal polymer can generate dust during camera operation or module assembly due to orientation of the polymer. Recently, the number of pixels of a small camera mounted on a mobile phone has increased to provide high image quality. The increase in the number of pixels can result in increased amounts of dust generated during camera operation or module assembly, which can deteriorate image quality. Thus, there is a need for a low-dust material that can be used in a small camera module.

Use of a thermoplastic material as a material capable of replacing a liquid crystal polymer has been studied. Among plastic materials, a polyamide resin represented by nylon is widely used as a material for various electric/electronic products due to the excellent mechanical properties thereof. In addition, in order to improve properties such as strength of a polyamide resin, a glass fiber-reinforced polyamide resin including glass fibers is widely used. However, there can be limitations in using a typical glass fiber-reinforced polyamide resin to fabricate a small module due to the low fluidity thereof. Also it can be difficult to reduce dust generation due to the glass fibers.

Therefore, there is a need for a low-dust high-fluidity material suitable for use in the manufacture of a small camera module.

SUMMARY OF THE INVENTION

Exemplary embodiments relate to a low-dust high-fluidity polyamide resin composition.

Exemplary embodiments also relate to a molded article which is produced from the polyamide resin composition set forth above and is suitable for a small camera module.

A polyamide resin composition includes: a base resin including a polyamide resin, which has an intrinsic viscosity (IV) of about 0.9 dL/g or less, and milled glass fibers; and carbon nanotube flakes having a size of about 1.0 mm to about 5.0 mm.

The polyamide resin may be, for example, polydecamethylene terephthalamide.

The milled glass fibers may have an aspect ratio of about 1 or more, and can have an average diameter of about 10 μm to about 13 μm and an average length of about 10 μm to about 100 μm.

The carbon nanotube flakes may be obtained by growing carbon nanotubes on glass fibers, followed by removing the glass fibers.

The carbon nanotube flakes may be present in an amount of about 0.05 parts by weight to about 5 parts by weight based on 100 parts by weight of the base resin.

The base resin may include about 50% by weight (wt %) to about 80 wt % of the polyamide resin, which has an intrinsic viscosity of about 0.9 dL/g or less, and about 20 wt % to about 50 wt % of the milled glass fibers.

The polyamide resin composition may have a spiral flow length of about 100 mm to about 160 mm, as measured on a specimen obtained by injection molding the polyamide resin composition in a 0.5 μm thick spiral-shaped mold under conditions of a molding temperature of 300° C., a mold temperature of 80° C., an injection pressure of 1,500 kgf/cm$^2$ and an injection speed of 120 mm/s.

The polyamide resin composition may have an amount of abrasion dust of about 0.9 mg or less, as measured after a boss and a rib manufactured using the polyamide resin composition are subjected to reciprocating motion at a rate of 50 cycles/min under a load of 2.5 kg for 2 hours. For example, the polyamide resin composition may have an amount of abrasion dust of about 0.8 mg or less. As another example, the polyamide resin composition may have an amount of abrasion dust of about 0.5 mg or less.

Exemplary embodiments also relate to a molded article produced from the polyamide resin composition according to the present invention as set forth above.

The molded article may have a surface current discharge time of about 0.1 seconds or less, as measured by a decay time method.

The molded article may be a small camera module.

According to the present invention, the polyamide resin composition can be suitable for molding of a small module due to excellent fluidity thereof and may be applied to a small camera module due to low dust generation upon molding or operation of a module.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

As a result of continuous studies for developing a low-dust high-fluidity material suitable for a small camera module, the present inventors found that the above properties as set forth above could be achieved using a polyamide resin composition according to the present invention, which was obtained by mixing carbon nanotube flakes having a specific size with a base resin including a polyamide resin having a specific intrinsic viscosity and milled glass fibers, thereby completing the present invention.

The polyamide resin composition according to the present invention includes: a base resin including a polyamide resin, which has an intrinsic viscosity (IV) of about 0.9 dL/g or less, and milled glass fibers; and carbon nanotube flakes having a size of about 1.0 mm to about 5.0 mm.

Hereinafter, each of the components of the resin composition according to the present invention will be described in detail.

Base Resin

The base resin includes the polyamide resin and the milled glass fibers.

Polyamide Resin

The polyamide resin includes an amino acid, lactam or diamine and a dicarboxylic acid as main components, and can have excellent heat resistance.

According to the present invention, the polyamide resin may have an intrinsic viscosity (IV) of about 0.9 dL/g or less, for example, an intrinsic viscosity of about 0.6 dL/g to about 0.9 dL/g. For example, the polyamide resin may have an intrinsic viscosity of about 0.05 dL/g, 0.1 dL/g, 0.15 dL/g, 0.2 dL/g, 0.25 dL/g, 0.3 dL/g, 0.35 dL/g, 0.4 dL/g, 0.45 dL/g, 0.5 dL/g, 0.55 dL/g, 0.6 dL/g, 0.65 dL/g, 0.7 dL/g, 0.75 dL/g, 0.8 dL/g, 0.85 dL/g, or 0.9 dL/g.

As used herein, the intrinsic viscosity (IV) is measured in a sulfuric acid solution at 25° C. using an Ubbelohde viscometer. If the intrinsic viscosity (IV) of the polyamide resin is greater than about 0.9 dL/g, the polyamide resin composition may not be suitable for molding of a small module such as a camera for mobile phones due to low fluidity thereof.

The polyamide resin may be any polyamide resin so long as the polyamide resin has intrinsic viscosity as set forth above. For example, the polyamide resin can be a $C_6$ to $C_{12}$ carbon chain-containing aromatic polyamide resin. When a long carbon chain-containing aromatic polyamide resin as set forth above is used, the polyamide resin composition can have excellent fluidity and low gas generation at high temperature.

Examples of the polyamide resin may include PA10T (polydecamethylene terephthalamide), PA6, PA66, PA6T, PA11T, PA12T, and the like, and mixtures thereof, without being limited thereto.

The polyamide resin may have a glass transition temperature (Tg) of about 120° C. or more. For example, the polyamide resin may have a glass transition temperature (Tg) of about 125° C. or more, and as another example, about 125° C. to about 150° C. The polyamide resin may have a melting temperature (Tm) of about 280° C. or more, for example, about 280° C. to about 350° C. When the glass transition temperature and the melting temperature of the polyamide resin satisfy the ranges as set forth above, the polyamide resin composition may have excellent heat resistance and moldability. The glass transition temperature and the melting temperature of the polyamide resin may be measured using a differential scanning calorimeter (DSC) and a thermogravimetric analyzer (TGA).

The base resin can include the polyamide resin in an amount of about 50 wt % to about 80 wt %, for example about 55 wt % to about 75 wt %, based on the total weight (100 wt %) of the base resin. In some embodiments, the base resin can include the polyamide resin in an amount of about 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt %. Within this range, the polyamide resin composition may have excellent mechanical properties and moldability.

Glass Fibers

Glass fibers are added to improve mechanical properties of the polyamide resin composition. According to the present invention, milled glass fibers are used as the glass fibers.

Although chopped glass fibers are typically used, the chopped glass fibers are likely to protrude out of the resin composition and can cause a problem of dust generation upon molding. However, since the milled glass fibers have a shorter average length than the chopped glass fibers having a length in the millimeter range, the milled glass fibers may suppress dust generation due to protrusion of glass fibers upon molding.

The milled glass fibers may be produced by pulverizing glass fibers by dry or wet milling, for example, using a ball mill, vibration ball mill, rod mill, pin mill, disk mill, bead mill, or hammer mill, without being limited thereto.

The milled glass fibers may have an aspect ratio of about 1 or more. For example, the milled glass fibers may have an aspect ratio of about 1 to about 10, for example, about 1, 2, 3, 4, 5, 6, 7, 8, 9, or 10.

As used herein, the aspect ratio refers to a ratio of an average length (L) to an average diameter (R) of the glass fibers (L/R). When the milled glass fibers have an aspect ratio of about 1 or more, the resin composition may have improved mechanical strength while minimizing deterioration in fluidity thereof.

The milled glass fibers may have an average diameter of about 5 μm to about 20 μm, for example an average diameter of about 10 μm to about 13 μm. In some embodiments, the milled glass fibers can have an average diameter of about 5, 6, 7, 8, 9, 10, 11, 12, 13, 14, 15, 16, 17, 18, 19 or 20 μm. Within this range, the resin composition may have improved mechanical strength while minimizing deterioration in fluidity thereof.

In exemplary embodiments, the milled glass fibers may have an average length of about 5 μm to about 200 μm, for example, an average length of about 10 μm to about 100 μm. Within this range, the resin composition may have improved mechanical strength while minimizing deterioration in fluidity thereof.

The base resin can include the milled glass fibers in an amount of about 20 wt % to about 50 wt %, for example about 25 wt % to about 45 wt %, based on the total weight (100 wt %) of the base resin. For example, the base resin can include the milled glass fibers in an amount of about 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %. Within this range, the polyamide resin composition may have excellent mechanical properties and moldability.

Carbon Nanotube Flakes

The carbon nanotube flakes can allow generated dust to be easily removed by imparting low resistance properties to the composition.

Typically, carbon nanotubes, carbon fibers and the like have been used to impart electrical conductivity to a composition. However, there are problems in that carbon nanotubes may deteriorate fluidity of a resin composition due to the large length of the carbon nanotubes and may be cut to generate dust upon molding of a small module. In addition, the carbon nanotubes can scatter and generate dust upon molding, and thus the carbon nanotubes are not suitable to realize low dustiness.

As a result of continuous studies to solve the problems as set forth above, the present inventors found that the resin composition could have excellent fluidity and low dustiness by adding the carbon nanotube flakes having a size of about 1.0 mm to about 5.0 mm to the resin composition. As used herein, the size of the carbon nanotube flakes refers to a length of the longest side of the carbon nanotube flakes (the longest length), as measured using an optical microscope.

The carbon nanotube flakes may be obtained, for example, by growing carbon nanotubes on a fiber material, followed by removing the fiber material. For example, a fiber material can be prepared and carbon nanotubes can be grown on the fiber material, followed by removing the fiber materials from the carbon nanotubes, thereby producing carbon nanotube flakes.

Examples of the fiber material can include without limitation carbon nanotubes, glass fibers, metal fibers, ceramic fibers, organic fibers and the like, and mixtures thereof, for example, glass fibers.

A catalytic nanoparticle layer for growing carbon nanotubes may be formed on the fiber material. Examples of the catalytic nanoparticles may include without limitation transition metals and/or various salts thereof. The catalytic nanoparticle layer may be formed on the fiber material by methods such as dip coating, spray coating, plasma deposition, evaporation, and electrolytic deposition, which are well known in the art.

After the catalytic nanoparticle layer is formed, carbon nanotubes can be grown on the catalytic nanoparticle layer. The carbon nanotubes can be grown by a process such as chemical vapor deposition, laser ablation, arc discharge, and flame synthesis, which are well known in the art.

An electric field and/or a magnetic field may be provided to adjust orientation of the carbon nanotubes upon growth of the carbon nanotubes, and/or reorientation of the carbon nanotubes by an electromechanical, mechanical and/or chemical method may be additionally performed after growth of the carbon nanotubes, as needed. The electromechanical method may include, for example, orienting the carbon nanotubes by providing an electric or magnetic field, without being limited thereto. The mechanical method may include extrusion, drawing, gas pressure aided dies and the like, and the chemical method may include a method of stretching the carbon nanotube-containing fiber material in a liquid including a solvent, a surfactant and/or a microemulsion, without being limited thereto.

When the carbon nanotubes are formed by the method as set forth above, the carbon nanotube flakes are obtained by removing the fiber material. In the method as set forth above, granule type carbon nanotube flakes, in which the carbon nanotubes are agglomerated, may be obtained. Since the carbon nanotube flakes have a size of about 1.0 mm to about 5.0 mm and thus are larger than typical nanotubes, the carbon nanotube flakes can have low scattering properties. In addition, since the carbon nanotube flakes are smaller than carbon fibers, the carbon nanotube flakes can suppress dust generation due to cutting or the like upon molding. In exemplary embodiments, the carbon nanotube flakes may have a size of about 1 mm, 1.5 mm, 2 mm, 2.5 mm, 3 mm, 3.5 mm, 4 mm, 4.5 mm, or 5 mm.

The carbon nanotube flakes impart electrical conductivity to the resin composition and thus can reduce surface resistance of a molded article after molding of the resin composition. Thus, even when dust is generated upon molding or product operation, the dust may be easily removed from a surface of the molded article.

The polyamide resin composition can include the carbon nanotube flakes in an amount of about 0.05 parts by weight to about 5 parts by weight, for example about 0.1 parts by weight to about 4 parts by weight, based on about 100 parts by weight of the base resin. If the amount of the carbon nanotube flakes is less than 0.05 parts by weight, improvement in dustiness of the resin composition can be insignificant. In addition, if the amount of the carbon nanotube flakes is greater than 5 parts by weight, the carbon nanotube flakes may adversely affect properties of the resin composition, and workability of the resin composition may be deteriorated. For example, the polyamide resin composition can include the carbon nanotube flakes in an amount of about 0.05 parts by weight, 0.1 parts by weight, 0.5 parts by weight, 1 part by weight, 1.5 parts by weight, 2 parts by weight, 2.5 parts by weight, 3 parts by weight, 3.5 parts by weight, 4 parts by weight, 4.5 parts by weight, or 5 parts by weight.

Additives

The polyamide resin composition according to the present invention may further include one or more of various additives in an amount with minimal or no effect on the properties discussed herein of the polyamide resin composition, and depending upon application, in addition to the components set forth above. Examples of the additives may include without limitation antioxidants, release agents, flame retardants, lubricants, colorants, functional additives, and the like, and mixtures thereof. When used, the polyamide resin composition can include the additives in an amount of about 10 parts by weight or less based on about 100 parts by weight of the base resin. For example, the additives may be present in an amount of about 0.01 parts by weight, 0.1 parts by weight, 0.5 parts by weight, 1 part by weight, 2 parts by weight, 3 parts by weight, 4 parts by weight, 5 parts by weight, 6 parts by weight, 7 parts by weight, 8 parts by weight, 9 parts by weight, or 10 parts by weight.

The polyamide resin composition according to the present invention may be prepared by a method of preparing a thermoplastic resin composition, which is known in the art. For example, the components set forth above may be mixed with other additives as needed, followed by melt-extruding the mixture in an extruder, thereby preparing the polyamide resin composition in the form of pellets.

The polyamide resin composition according to the present invention can have high fluidity and low dustiness. For example, the polyamide resin composition can have a spiral flow length of about 100 mm to about 160 mm, for example, about 110 mm to about 140 mm, as measured on a specimen obtained by injection molding the polyamide resin composition in a 0.5 mm thick spiral-shaped mold under conditions of a molding temperature of 300° C., a mold temperature of 80° C., an injection pressure of 1,500 $kgf/cm^2$ and an injection speed of 120 mm/s. For example, the polyamide resin composition may have a spiral flow length of about 100 mm, 105 mm, 110 mm, 115 mm, 120 mm, 125 mm, 130 mm, 135 mm, 140 mm, 145 mm, 150 mm, 155 mm, or 160 mm.

In addition, the polyamide resin composition may have an amount of abrasion dust of about 0.9 mg or less, as measured after a boss and a rib manufactured using the polyamide resin composition are subjected to reciprocating motion at a rate of 50 cycles/min under a load of 2.5 kg for 2 hours. For example, the polyamide resin composition may have an amount of abrasion dust of about 0.8 mg or less, for example, about 0.5 mg or less.

A molded article according to the present invention is produced from the polyamide resin composition set forth above. The molded article according to the present invention may be manufactured by molding the polyamide resin composition by various molding methods such as injection molding, extrusion, vacuum molding, and casting. These molding methods are well known to those skilled in the art.

The molded article according to the present invention can exhibit less dust generation upon molding and operation thereof and can have excellent dust removing capabilities due to low surface resistance thereof. For example, the molded article according to the present invention may have a surface current discharge time of about 0.1 seconds or less, as measured by a decay time method.

The molded article may be used for applications such as interior/exterior materials of electric/electronic products, and may be usefully used as a material of a small camera module applied to mobile phones and the like.

Next, the present invention will be described in more detail with reference to the following examples. It should be understood that these examples are provided for illustration only and are not to be construed in any way as limiting the present invention.

EXAMPLES

Details of components used in the Examples and Comparative Examples are as follows.

(A) Resin (A-1) TGP 362 (Evonik Industries AG, intrinsic viscosity: 0.85 dL/g) corresponding to a polyamide resin is used.

(A-2) TGP 357 (Evonik Industries AG, intrinsic viscosity: 0.95 dL/g) corresponding to a polyamide resin is used.

(A-3) S6000 (Solvay Specialty Polymers) corresponding to a liquid crystal polymer resin is used.

(B) Inorganic Filler (B-1) Glass fibers: EFH75-01 (Central Glass Co., Ltd., average diameter: 10 μm, average length: 50 μm) corresponding to milled glass fibers is used.

(B-2) Carbon fibers: CM-150 (Hanwha Chemical Co., Ltd.) is used.

(C) Carbon nanotube flakes: PU Post Coated CNS Flake (Applied Nanostructured Solutions, LLC) having a flake size of 1.0 mm to 5.0 mm is used.

Examples 1 to 2 and Comparative Examples 1 to 3

The components are mixed in amounts as listed in Table 1 and introduced into a twin screw type extruder having L/D=36 and a diameter of 45 mm. Next, the mixture is melt-extruded under conditions of a temperature of 320° C., a screw rotation speed of 200 rpm and an ejection rate of 80 kg/hr, thereby preparing a polyamide resin composition in pellet form.

In Table 1, the amounts of the (A) and (B) components are given in units of wt % based on the sum of the amounts of the (A) and (B) components and the amount of the (C) component is given in units of parts by weight based on 100 parts by weight of the sum of the amounts of the (A) and (B) components.

TABLE 1

| Component | | Example 1 | Example 2 | Comparative Example 1 | Comparative Example 2 | Comparative Example 3 |
|---|---|---|---|---|---|---|
| (A) | (A-1) | 65 | 70 | — | — | 65 |
|  | (A-2) | — | — | 70 | — | — |
|  | (A-3) | — | — | — | 100 | — |
| (B) | (B-1) | 35 | 30 | — | — | 35 |
|  | (B-2) | — | — | 30 | — | — |
| (C) |  | 0.1 | 0.1 | 0.1 | 0.1 | — |

Each of the polyamide resin compositions of Examples 1 to 2 and Comparative Examples 1 to 3 is evaluated as to the following properties. Results are shown in Table 2.

Evaluation of Properties (1) Spiral flow length (unit: mm): Each of the resin compositions prepared in the Examples and Comparative Examples is subjected to injection molding under conditions of a molding temperature of 300° C., a mold temperature of 80° C., an injection pressure of 1,500 kgf/cm$^2$ and an injection speed of 120 mm/s using an injection molding machine (LGE 110, LS Mtron Ltd.) and a 0.5 mm thick spiral-shaped mold, followed by measuring a length of a specimen. A longer length of the specimen indicates better specimen moldability.

(2) Amount of abrasion dust (unit: mg): A boss and a rib are manufactured by molding each of the resin compositions prepared in the Examples and Comparative Examples. Next, the boss is reciprocated on an upper surface of the rib at 50 cycles/min under a load of 2.5 kg for 2 hours, and then the abrasion amount of the rib is measured.

(3) Decay time (unit: seconds): A specimen is prepared by injection molding each of the resin compositions prepared in the Examples and Comparative Examples. Then, with the specimen placed on a grounded metallic plate, a voltage of 1000 V is applied to the plate, followed by measuring decay time corresponding to current discharge time.

(4) Tensile elongation (unit: %): Tensile elongation is measured in accordance with ASTM D 638.

(5) Tensile strength (unit: kgf/cm$^2$): Tensile strength is measured in accordance with ASTM D 638.

(6) Heat deflection temperature (HDT, unit: ° C.): Heat deflection temperature is measured in accordance with ASTM D 648.

TABLE 2

| Property | Example 1 | Example 2 | Comparative Example 1 | Comparative Example 2 | Comparative Example 3 |
|---|---|---|---|---|---|
| Spiral flow length (mm) | 135 | 110 | 80 | 175 | 150 |
| Amount of abrasion dust (mg) | 0 | 0.10 | 0.5 | 1.00 | 0 |
| Decay time (second) | <0.1 | <0.1 | >0.1 | >0.1 | >10.0 |
| Tensile elongation (%) | 2.2 | 3.3 | 1.0 | 1.8 | 3.0 |
| Tensile strength (kgf/cm$^2$) | 870 | 1520 | 1300 | 730 | 900 |
| Heat deflection temperature (° C.) | 268 | 270 | 270 | 236 | 270 |

As shown in Table 2, the polyamide resin compositions of Examples 1 and 2, which include a polyamide having an intrinsic viscosity (IV) of 0.9 dL/g or less, milled glass fibers and carbon nanotube flakes, have excellent moldability, low amount of abrasion dust, and low surface resistance.

On the other hand, the polyamide resin composition of Comparative Example 1, which includes a polyamide having an intrinsic viscosity (IV) of greater than 0.9 dL/g and carbon fibers instead of glass fibers, suffers from deterioration in moldability and surface resistance and has a high amount of abrasion dust, and the polyamide resin composition of Comparative Example 2, which includes a liquid crystal polymer resin instead of the polyamide resin, has a high amount of abrasion dust. In addition, when dust is generated on a surface of the polyamide resin composition of Comparative Example 3, which did not include the carbon nanotube flakes, it is not easy to remove the dust due to high surface resistance of the polyamide resin composition.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. The scope of the present invention should be defined by the appended claims and equivalents thereof.

What is claimed is:

1. A polyamide resin composition comprising:
   a base resin comprising a polyamide having an intrinsic viscosity (IV) of about 0.9 dL/g or less, and milled glass fibers; and
   carbon nanotube flakes having a size of about 1.0 mm to about 5.0 mm, wherein the carbon nanotube flakes are obtained by growing carbon nanotubes on glass fibers, followed by removing the glass fibers,
   wherein the polyamide resin composition has a spiral flow length of about 110 mm to about 160 mm, as measured on a specimen obtained by injection molding the polyamide resin composition in a 0.5 mm thick spiral-shaped mold under conditions of a molding temperature of 300° C., a mold temperature of 80° C., an injection pressure of 1,500 kgf/cm$^2$ and an injection speed of 120 mm/s,
   wherein the polyamide resin composition has an amount of abrasion dust of about 0.1 mg or less, as measured after a boss and a rib manufactured using the polyamide resin composition are subjected to reciprocating motion at a rate of 50 cycles/min under a load of 2.5 kg for 2 hours, and
   wherein a molded article produced from the polyamide resin composition has a surface current discharge time of about 0.1 seconds or less, as measured by a decay time method.

2. The polyamide resin composition according to claim 1, wherein the polyamide is polydecamethylene terephthalamide.

3. The polyamide resin composition according to claim 1, wherein the milled glass fibers have an aspect ratio of about 1 or more.

4. The polyamide resin composition according to claim 1, wherein the milled glass fibers have an average diameter of about 10 μm to about 13 μm and an average length of about 10 μm to about 100 μm.

5. The polyamide resin composition according to claim 1, wherein the carbon nanotube flakes are present in an amount of about 0.05 parts by weight to about 5 parts by weight based on about 100 parts by weight of the base resin.

6. The polyamide resin composition according to claim 1, wherein the base resin comprises about 50 wt % to about 80 wt % of the polyamide, which has an intrinsic viscosity of about 0.9 dL/g or less, and about 20 wt % to about 50 wt % of the milled glass fibers.

7. A molded article produced from the polyamide resin composition according to claim 1.

8. The molded article according to claim 7, wherein the molded article is a small camera module.

* * * * *